J. R. BUTTWEILER.
STEERING DEVICE.
APPLICATION FILED FEB. 10, 1916.
1,212,451. Patented Jan. 16, 1917.
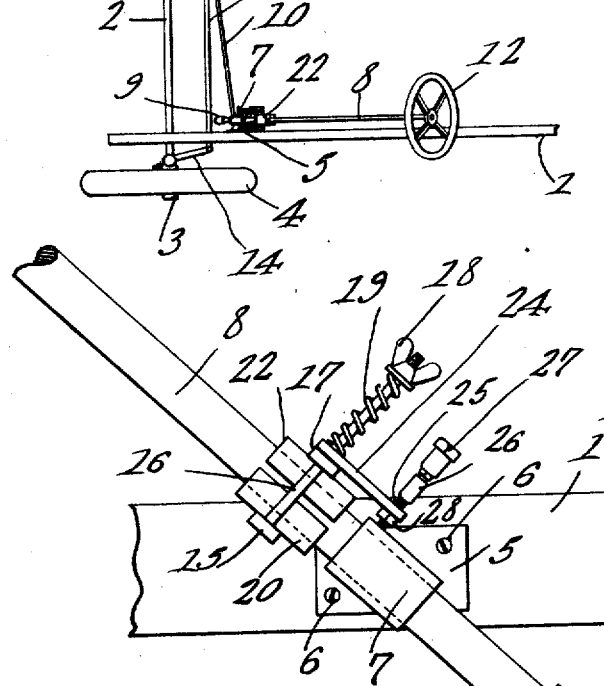
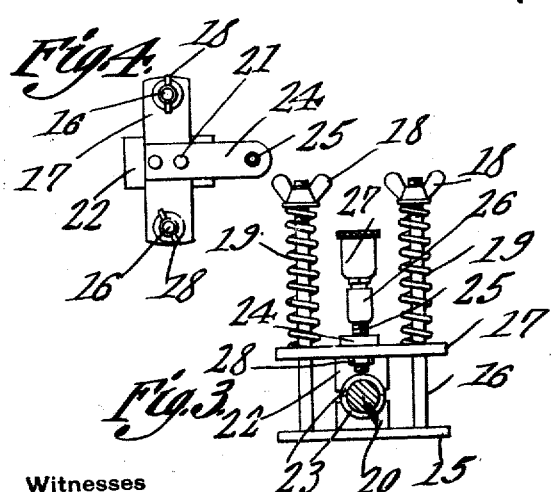
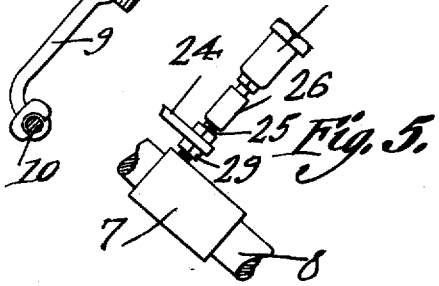
J. R. Buttweiler
Inventor

UNITED STATES PATENT OFFICE.

JOHN R. BUTTWEILER, OF FREEPORT, MINNESOTA.

STEERING DEVICE.

1,212,451.

Specification of Letters Patent.  Patented Jan. 16, 1917.

Application filed February 10, 1916. Serial No. 77,465.

*To all whom it may concern:*

Be it known that I, JOHN R. BUTTWEILER, a citizen of the United States, residing at Freeport, in the county of Stearns and State of Minnesota, have invented a new and useful Steering Device, of which the following is a specification.

It is the object of this invention to provide a novel structure whereby a braking pressure may be applied to the steering shaft of a motor propelled vehicle, thereby to cause the rotation of the said shaft to be comparatively easy or relatively difficult as occasion may demand, it being a matter well within the knowledge of those skilled in the art that, upon a rough road and under other conditions, it is desirable that the steering wheel shaft be manipulable with greater difficulty than otherwise.

Another object of the invention is to provide novel means whereby such a brake structure may be assembled with a known form of automobile, without working extensive changes therein.

With the above and other objects in view which will appear as the description proceeds, the invention resides in the combination and arrangement of parts and in the details of construction hereinafter described and claimed; it being understood that changes in the precise embodiment of the invention herein disclosed can be made within the scope of what is claimed, without departing from the spirit of the invention.

In the accompanying drawing:—Figure 1 shows in top plan, a portion of the frame of a motor propelled vehicle, whereunto the device forming the subject matter of this application has been attached; Fig. 2 is an elevation wherein the device forming the subject matter of this application appears applied to a portion of a motor propelled vehicle; Fig. 3 is an elevation of the structure forming the subject matter of this application; Fig. 4 is a top plan of the device as delineated in Fig. 3; Fig. 5 is a fragmental view similar to Fig. 2, but showing a slight modification in the invention.

In the accompanying drawings, there appears a pair of side bars 1 constituting a part of the chassis of a motor propelled vehicle. The front axle of the vehicle is shown at 2 and carries movable axle ends 3, supporting ground wheels 4. To one of the side bars 1 of the chassis a foot plate 5 is attached by means of securing elements 6, the foot plate 7 being provided with a bearing 7 in which a steering shaft 8 is journaled, the shaft being provided at its upper end with a wheel 12. Attached to the lower end of the steering shaft 8 is an arm 9 pivotally united with a connecting rod 10 pivoted to a cross bar 12 which, in its turn is pivoted at its ends to extensions 14, constituting parts of the movable axle ends 3.

The description as thus far proceeded with sets forth a construction constituting a part of a Ford automobile. For the device above described no novelty is claimed, saving in so far as it may coöperate with parts hereinafter set forth.

In carrying out the present invention there is provided a clamp including a bottom member 15 in the form of a bar, provided with upstanding rods or arms 16, passing slidably through openings in a top member or bar 17. Threaded onto the upper ends of the arms 16 are nuts 18. Strong compression springs 19 surround the arms 16 above the top member 16, the upper ends of the compression spring 19 being engaged by the nuts 18, and the lower ends of the compression springs being engaged by the top member 17. A shoe 20 is secured to the lower face of the top member 17 by means of attaching elements 21. A shoe 22 is secured to the upper face of the bottom member 15. The shoes 22 and 20 lie on opposite sides of the steering shaft 8 and are grooved to operate with the steering shaft, the shoes ordinarily carrying friction facings 23. Secured to the top member 17 of the clamp by the elements 21 is an extension or arm 24. A tube 25 is assembled with the bearing 7 and constitutes a means whereby oil may be delivered into the bearing to lubricate the steering shaft 8. Mounted on the tube 25 is a nipple 26 connected with an oil cup 27. The extension or arm 24 may be threaded onto the tube 25 and may be held in place by a single clamp nut 28, or if desired, as shown in Fig. 5, the extension need not be threaded onto the tube 25, but may be held thereon by means of opposed clamping nuts 29.

In practical operation, the shoes 20 and 22 coöperate to exert a variable braking pressure on the steering shaft 8, this braking pressure being adjusted by rotating the nuts 18, so as to increase or diminish the pressure of the springs 19.

An oil cup (not shown) ordinarily is assembled directly with the bearing 7, in an automobile of the type above described. When the oil cup is removed, the tube 25 is inserted into the bearing 7 in the place of the oil cup, the oil cup being mounted in the end of the tube, as shown at 27. Then, with the tube 25 is assembled the extension or arm 24, either after the showing of Fig. 2 or after the showing of Fig. 5.

From the foregoing it will be obvious that the present application discloses a means whereby a brake structure for the steering rod on a motor propelled vehicle may be connected with such a vehicle of standard and known form, without working extensive changes therein.

Having thus described the invention, what is claimed is:—

In a motor propelled vehicle, a chassis; a ground wheel assembled therewith; a bearing carried by the chassis; a steering shaft journaled in the bearing; an operative connection between the steering shaft and the ground wheel; an oil tube carried by the bearing and discharging on the shaft; an arm secured to the tube and extended longitudinally of the shaft; a top member secured to the arm; a bottom member; shoes carried by the top and bottom members and engaging the steering shaft; rods secured to the bottom member and passing slidably through the top member; compression springs on the rods and abutting against the top member; and adjusting devices on the rods and engaging the springs.

In testimony that I claim the foregoing as my own, I have hereto affixed my signature in the presence of two witnesses.

JOHN R. BUTTWEILER.

Witnesses:
C. M. STUNTEBECK,
FRANK RIELAND.